(12) United States Patent
Kohno et al.

(10) Patent No.: US 8,487,940 B2
(45) Date of Patent: Jul. 16, 2013

(54) DISPLAY DEVICE, TELEVISION RECEIVER, DISPLAY DEVICE CONTROL METHOD, PROGRAMME, AND RECORDING MEDIUM

(75) Inventors: Yoshinori Kohno, Osaka (JP); Kohichi Takaku, Osaka (JP); Kenji Watanabe, Osaka (JP); Tetsuo Ikeyama, Osaka (JP); Masahiko Takiguchi, Osaka (JP); Mihoko Watanabe, Osaka (JP); Tsuyoshi Ohmori, Osaka (JP); Hiroaki Okumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/636,313

(22) PCT Filed: Mar. 25, 2011

(86) PCT No.: PCT/JP2011/057470
§ 371 (c)(1),
(2), (4) Date: Sep. 20, 2012

(87) PCT Pub. No.: WO2011/118815
PCT Pub. Date: Sep. 29, 2011

(65) Prior Publication Data
US 2013/0002695 A1    Jan. 3, 2013

(30) Foreign Application Priority Data

Mar. 25, 2010 (JP) ................................. 2010-070516
Mar. 25, 2011 (JP) ................................. 2011-068697

(51) Int. Cl.
*G06F 15/00* (2006.01)
*G06F 3/00* (2006.01)

(52) U.S. Cl.
USPC ......................................... 345/501; 715/722

(58) Field of Classification Search
None
See application file for complete search history.

(56) References Cited

U.S. PATENT DOCUMENTS 6,791,624 B1 * 9/2004 Suga ............................. 348/588
8,209,716 B2 * 6/2012 Michel et al. .................... 725/38
(Continued)

FOREIGN PATENT DOCUMENTS

JP          10-215417 A       8/1998
JP          2005-229352 A     8/2005
(Continued)

OTHER PUBLICATIONS

"Omakase Donpisha Kougashitsu" (Automatic Adjustment of the Highest Image Quality) [online], Toshiba Corporation, (retrieved on Jan. 18, 2010), Internet <http://www.toshiba.co.jp/regza/detail/omakase/about.html>.

(Continued)

*Primary Examiner* — Hau Nguyen
*Assistant Examiner* — Ryan M Gray
(74) *Attorney, Agent, or Firm* — Birch, Stewart, Kolasch & Birch, LLP

(57) ABSTRACT

A display device (10) includes: a display section (23) which displays a picture; a user specifying section (130) which specifies a user viewing the display device; an image quality specifying section (170) which, in a case where the user specifying section (130) has specified a plurality of users, (i) obtains, from a recording section which records a plurality of setting values that correspond to user information for discriminating the plurality of users and are used to adjust an image quality, the plurality of setting values that correspond to the respective plurality of users thus specified and (ii) specifies, in accordance with the plurality of setting values thus obtained, a plurality of image qualities of a respective plurality of pictures to be displayed in the display section (23); and an image quality adjustment instructing section (150) which instructs an image quality adjusting section (22) to cause the display section (23) to display the plurality of pictures at the respective plurality of image qualities thus specified.

8 Claims, 11 Drawing Sheets

U.S. PATENT DOCUMENTS

| | | | |
|---|---|---|---|
| 2005/0108645 A1* | 5/2005 | Prentice et al. | 715/722 |
| 2007/0126884 A1 | 6/2007 | Xu et al. | |
| 2009/0185033 A1 | 7/2009 | Nozaki | |
| 2009/0284619 A1 | 11/2009 | Akao et al. | |

FOREIGN PATENT DOCUMENTS

| | | |
|---|---|---|
| JP | 2006-100881 A | 4/2006 |
| JP | 2008-180860 A | 8/2008 |
| JP | 2009-164977 A | 7/2009 |
| WO | WO 98/42127 A1 | 9/1998 |
| WO | WO 2008/001877 A1 | 1/2008 |
| WO | WO 2008/021710 A1 | 2/2008 |

OTHER PUBLICATIONS

PCT/ISA/210—international Search Report mailed May 17, 2011, issued in PCT/JP2011/057470.

PCT/ISA/237—Written Opnion of the international Searching Authority mailed May 17, 2011, issued in PCT/JP2011/057470.

Search Report for corresponding European Patent Application No. 11759619.7 dated Apr. 19, 2013.

* cited by examiner

FIG. 5

|  | Father | Mother | Child 1 | Child 2 |
|---|---|---|---|---|
| Sport | Image 3 | Image 2 | Image 2 | Image 3 |
| Video | Image 2 | Image 2 | Image 3 | Image 3 |
| Film | Image 1 | Image 2 | Image 3 | Image 2 |

FIG. 6

|  | Father | Mother | Child 1 | Child 2 |
|---|---|---|---|---|
| Sport | Luminance Level: +30<br>Black Level: 0<br>Color Depth: +10<br>Color Tone: 0<br>Sharpness: +4 | Luminance Level: +29<br>Black Level: 0<br>Color Depth: +8<br>Color Tone: 0<br>Sharpness: +3 | Luminance Level: +29<br>Black Level: 0<br>Color Depth: +8<br>Color Tone: 0<br>Sharpness: +3 | Luminance Level: +30<br>Black Level: 0<br>Color Depth: +9<br>Color Tone: 0<br>Sharpness: +3 |
| Video | Luminance Level: +30<br>Black Level: 0<br>Color Depth: +4<br>Color Tone: 0<br>Sharpness: +1 | Luminance Level: +30<br>Black Level: 0<br>Color Depth: +5<br>Color Tone: 0<br>Sharpness: +2 | Luminance Level: +30<br>Black Level: 0<br>Color Depth: +7<br>Color Tone: 0<br>Sharpness: +3 | Luminance Level: +30<br>Black Level: 0<br>Color Depth: +7<br>Color Tone: 0<br>Sharpness: +3 |
| Film | Luminance Level: +25<br>Black Level: +1<br>Color Depth: -2<br>Color Tone: 0<br>Sharpness: 0 | Luminance Level: +28<br>Black Level: +1<br>Color Depth: 0<br>Color Tone: +1<br>Sharpness: 0 | Luminance Level: +30<br>Black Level: 0<br>Color Depth: +5<br>Color Tone: 0<br>Sharpness: +2 | Luminance Level: +30<br>Black Level: 0<br>Color Depth: +3<br>Color Tone: 0<br>Sharpness: +1 |

DISPLAY DEVICE, TELEVISION RECEIVER, DISPLAY DEVICE CONTROL METHOD, PROGRAMME, AND RECORDING MEDIUM

TECHNICAL FIELD

The present invention relates to a display device that displays a picture by changing an image quality automatically in accordance with a user who is viewing the display device, a television receiver, a display device control method, a program, and a computer-readable recording medium in which the program is recorded.

BACKGROUND ART

Patent literature 1 discloses a television receiver arranged as below. In a case where the television receiver which has read features of a user's finger identifies the use's finger as a registered finger, the television receiver controls operation so that a predetermined setting corresponding to the identified finger is made.

Patent Literature 2 discloses a recording and reproducing apparatus that automatically recognizes a user and then shows program information in accordance with information on the user's preference.

Patent Literature 3 discloses a display system in which an infrared angle sensor is provided to a main body of a display device. In a case where a display section is subjected to remote control from different angles, the display system registers viewing angles in a remote controller and outputs angle registration signals.

Non-Patent Literature 1 discloses a television which automatically adjusts an image quality in accordance with a brightness of a room and a color of lighting so that a picture is displayed in an optimum image quality.

CITATION LIST

Patent Literatures
  Patent Literature 1
  Japanese Patent Application Publication, Tokukaihei, No. 10-215417 (Publication Date: Aug. 11, 1998)
  Patent Literature 2
  Japanese Patent Application Publication, Tokukai, No. 2006-100881 (Publication Date: Apr. 13, 2006)
  Patent Literature 3
  Japanese Patent Application Publication, Tokukai, No. 2008-180860 (Publication Date: Aug. 7, 2008)
Non-Patent Literature
  Non-Patent Literature 1
  "Omakase Donpisha Kougashitsu" (Automatic Adjustment of the Highest Image Quality) [online], TOSHIBA CORPORATION, (retrieved on Jan. 18, 2010), Internet <http://www.toshiba.co.jp/regza/detail/omakase/about.html>

SUMMARY OF INVENTION

Technical Problem

The number of users viewing a display device is not always one. A plurality of users may view the display device at one time. Such a case is exemplified by a case where a family views a program. However, according to the techniques disclosed in Patent Literatures 1 and 2, an image quality is not adjusted in accordance with preferences of all of a plurality of users viewing a program together. According to the technique disclosed in Patent Literature 3, it is troublesome for a plurality of users to set angles in advance by using the remote controller. The display system which is disclosed in Patent Literature 3 and in which an angle detecting sensor using infrared rays is provided to a front section of the main body of the display device causes the following problem. A television or the like using a fluorescent tube in a backlight cannot accurately determine an incident angle of infrared rays due to interference of infrared rays or the like to be released from the fluorescent tube side at, for example, turn-on of the display device.

The present invention has been made in view of the problems, and a main object of the present invention is to provide a display device that displays an image by automatically adjusting an image quality in accordance with preferences of a plurality of users.

Solution to Problem

In order to attain the object, a display device in accordance with the present invention includes: a display section which displays a picture; an image quality adjusting section which adjusts an image quality of the picture and causes the display section to display the picture whose image quality has been adjusted; user specifying means for specifying a user viewing the display device; image quality specifying means for, in a case where the user specifying means has specified a plurality of users, (i) obtaining, from a recording section which records a plurality of setting values that are associated with user information for discriminating the plurality of users and are used by the image quality adjusting section to adjust the image quality, the plurality of setting values which are associated with the user information corresponding to the respective plurality of users, and (ii) specifying, in accordance with the plurality of setting values thus obtained, a plurality of image qualities of a respective plurality of pictures to be displayed in the display section; and image quality adjustment instructing means for instructing the image quality adjusting section to cause the display section to display the plurality of pictures at the respective plurality of image qualities specified by the image quality specifying means.

A method for controlling a display device in accordance with the present invention, which is a method for controlling a display device which displays a picture, includes the steps of: (a) specifying a user viewing the display device; (b) in a case where a plurality of users have been specified in the step (a), (i) obtaining, from a recording section which records a plurality of setting values that are associated with user information for discriminating the plurality of users and are used by an image quality adjusting section to adjust the image quality, the plurality of setting values which are associated with the user information corresponding to the respective plurality of users, and (ii) specifying a plurality of image qualities in accordance with the plurality of setting values thus obtained; and (c) instructing the image quality adjusting section to display a plurality of pictures at the respective plurality of image qualities specified in the step (b).

According to the arrangement, in a case where a plurality of users viewing the display device are specified, from the recording section which records a plurality of setting values that are associated with user information for discriminating the plurality of users, the plurality of setting values which correspond to the user information associated with the respective plurality of users are obtained. Then, an image quality is specified in accordance with the plurality of setting values thus obtained, and the image quality is adjusted in accordance with a setting value of the image quality thus specified.

This makes it possible to specify a plurality of users viewing the display device, and yields an effect of displaying a picture at an image quality which meets preferences of a respective plurality of users.

A television receiver in accordance with the present invention includes a display device in accordance with the present invention.

Note that the display device in accordance with the present invention may be realized by a computer. In this case, (i) a program for causing the computer to operate as the display device and (ii) a computer-readable recording medium in which the program is recorded are both encompassed in the scope of the present invention.

Advantageous Effects of Invention

As described earlier, according to the display device in accordance with the present invention, in a case where a plurality of users viewing the display device are identified, from the recording section which records a plurality of setting values that are associated with user information for discriminating the plurality of users, the plurality of setting values which correspond to the user information associated with the respective plurality of users are obtained. Then, an image quality is specified in accordance with the plurality of setting values thus obtained, and the image quality is adjusted in accordance with a setting value of the image quality thus specified. This enables specification of a plurality of users viewing the display device, and yields an effect of displaying a picture at an image quality which meets preferences of a respective plurality of users.

BRIEF DESCRIPTION OF DRAWINGS

FIG. 1 shows an arrangement of a display device in accordance with a first embodiment of the present invention.

FIG. 2 shows an example of an overall arrangement in accordance with the present invention.

FIG. 3 is a flowchart showing how a main control section of the display device carries out a process related to an image quality and user specification.

FIG. 4 shows an example of a user registration screen to be displayed in a display section of the display device.

FIG. 5

FIG. 5 shows an example of image information recorded in a recording section of the display device.

FIG. 6

FIG. 6 shows another example of an image quality adjustment value recorded in the recording section of the display device.

FIG. 7 shows an example of an image quality adjustment value which is displayed in the display section of the display device and has been set for each user.

FIG. 8 is a flowchart showing how a main control section of the display device carries out a process related to user specification.

FIG. 9 shows an example in accordance with the first embodiment of how to display a selection screen in which an image quality setting that meets preferences of a respective plurality of users is selected. (a) of FIG. 9 shows an example of a case where a picture whose image quality has been adjusted in accordance with an image quality adjustment value of a specific user is displayed in the display device. (b) of FIG. 9 shows an example of how to display selection screens for selecting, from a plurality of screens whose image qualities have been adjusted in accordance with image quality adjustment values of respective users, an image quality that meets preferences of a respective plurality of users.

FIG. 10 shows an example of an arrangement of a remote controller in accordance with the first embodiment.

FIG. 11 shows an example in accordance with the first embodiment of how pictures whose image qualities have been adjusted in accordance with image quality adjustment values of respective users are displayed in respective parts into which a screen has been divided by the number of users viewing the display device.

FIG. 12 shows an example of a screen in which programs that the respective users view regularly are displayed in FIG. 11.

FIG. 13 shows an example of a display screen which is obtained in a case where two separate screens are combined into one screen to carry out a display in FIG. 12.

FIG. 14 shows an arrangement of another embodiment of the display device in accordance with the present invention.

FIG. 15 shows an arrangement of still another embodiment of the display device in accordance with the present invention.

DESCRIPTION OF EMBODIMENTS

<First Embodiment>

The following description discusses the first embodiment of the present invention with reference to FIGS. 1 to 7.

[Overall Arrangement]

Figure 2:
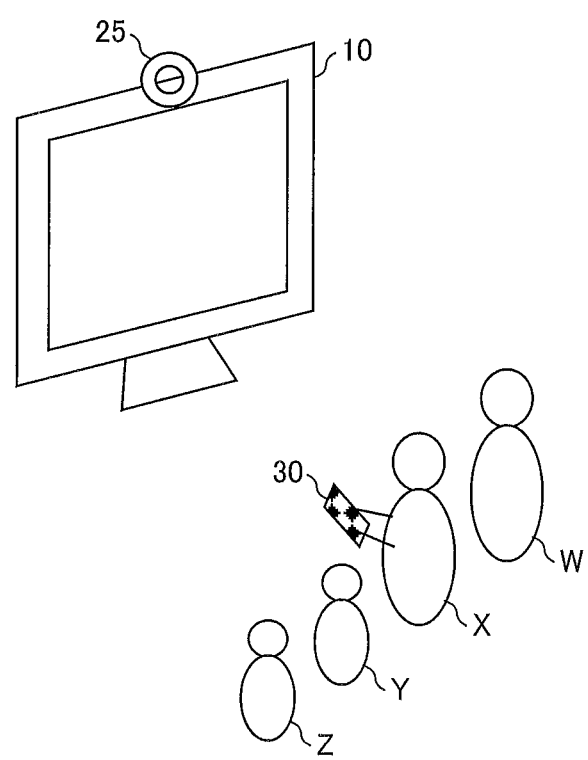
FIG. 2

First, the following description discusses an overall arrangement of the present embodiment with reference to FIG. 2. FIG. 2 is an image view showing an example of an overall arrangement in accordance with the present embodiment.

A reference numeral 10 indicates a display device (see FIG. 2).

The display device 10 includes a camera 25 which is an example of a photographing section. The camera 25 is provided so as to photograph a vicinity of the display device 10 (e.g., an area in which a user viewing the display device is supposed to be present). Assume here that users W to Z are present in front of the display device 10, and in order to identify all of the users viewing the display device 10, the camera 25 photographs an area in which the users W to Z are present. Note that a CCD (Charge Coupled Device) camera, for example, may be used as the camera 25. However, the camera 25 is not limited to this. Note also that the camera 25 does not need to be integrated with the display device 10 but may be provided separately from the display device 10.

The users W to Z view a picture displayed on the display device 10. The users W to Z use a remote controller 30 to control operation of the display device.

Note that the present embodiment assumes that users viewing the display device are the four users W to Z. However, the number of users viewing the display device is not limited to this.

[Arrangement of Display Device]

Figure 1:
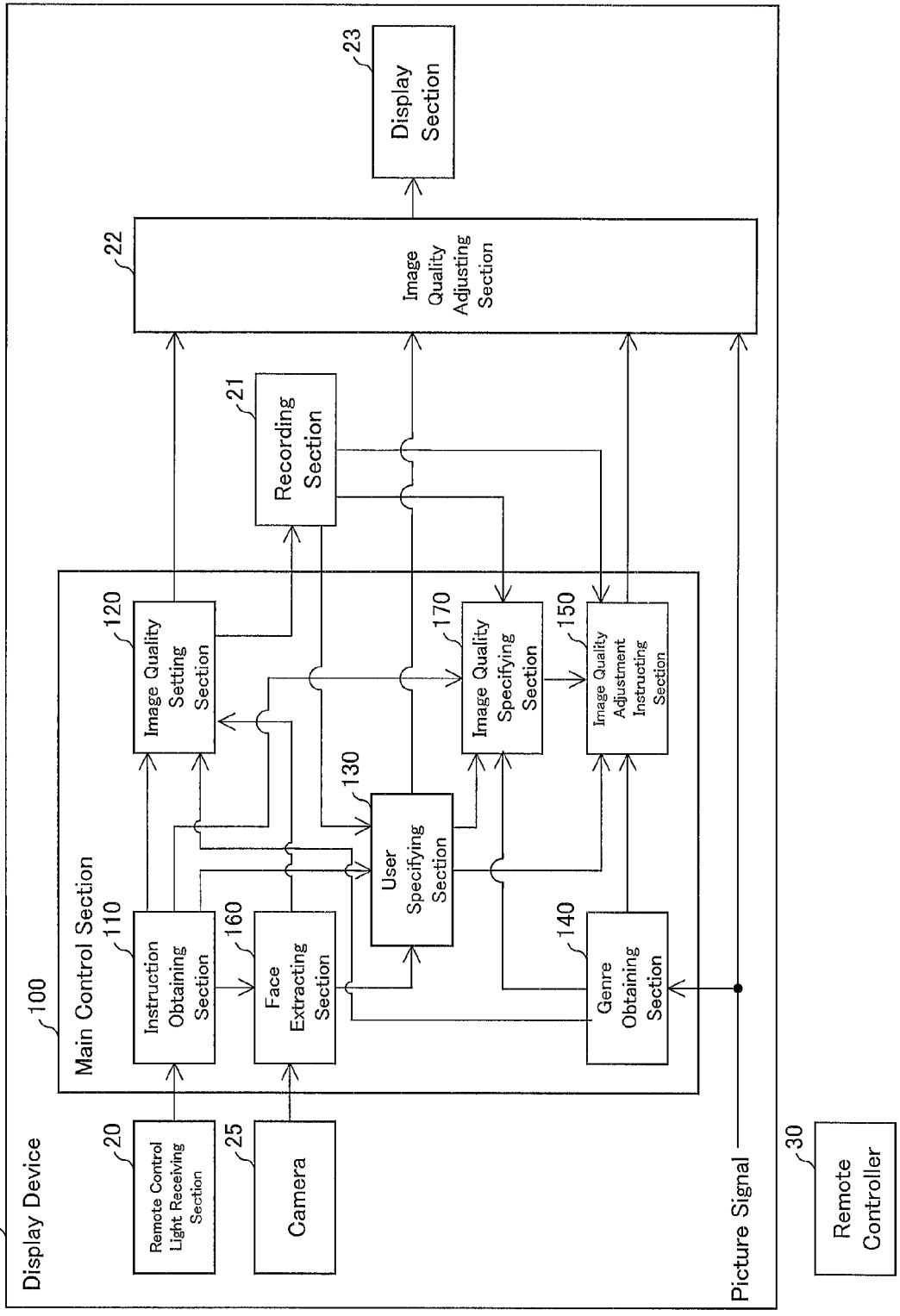
FIG. 1

Next, the following description discusses an arrangement of the display device 10 with reference to FIG. 1. FIG. 1 is a block diagram showing an arrangement of the display device 10.

The display device 10 includes a remote control light receiving section 20, a recording section 21, an image quality adjusting section 22, a display section 23, the camera (photographing section) 25, and a main control section 100 (see FIG. 1). The main control section 100 includes an instruction obtaining section 110, an image quality setting section 120, a user specifying section (user specifying means) 130, a genre obtaining section (genre obtaining means) 140, an image quality adjustment instructing section (image quality adjustment instructing means) 150, a face extracting section (face extracting means) 160, and an image quality specifying section (image quality specifying means) 170. The display device 10 is arranged to be capable of receiving a remote control signal from the remote controller 30.

The remote control light receiving section 20 receives the remote control signal from the remote controller 30 in the form of light such as infrared light. The remote control light receiving section 20 supplies, to the main control section 100, the remote control signal thus received.

The recording section 21 records various pieces of data and various programs. The recording section 21 is exemplified by (i) a ROM (Read Only Memory) which is a read-only semiconductor memory that records fixed data such as a program necessary for the operation of the main control section 100 and (ii) a RAM (Random Access Memory) which is a so-called working memory that temporarily records data to be used for arithmetic operation, a result of the arithmetic operation, and the like.

The recording section 21 also records an image quality adjustment value, user information, and genre information. Note here that the image quality adjustment value is a setting value with which the image quality adjusting section 22 adjusts an image quality. The user information is information about a user such as information for recognizing a user for whom an image quality adjustment value has been set. The genre information indicates a genre of a picture. The information for recognizing a user is exemplified by (i) user facial information indicative of facial features extracted from a facial image for specifying a face of a user and (ii) a user name of the user.

The recording section 21 also records (i) data in which user information, genre information, and an image quality adjustment value are associated with each other and (ii) data in which genre information about a picture viewed within a past given time period and user information corresponding to a user who viewed the picture are associated with each other. The data in which user information, genre information, and an image quality adjustment value are associated with each other refers to an image quality adjustment value set for the user information and the genre information. The data in which genre information about a picture viewed within a past given time period and user information corresponding to a user who viewed the picture are associated with each other refers to a history of the user's viewing of a picture of the genre information. Note here that the "past given time period"
may be, for example, the past day or two, or may be any time on or after the first time when the display device 10 was used. For example, the past given time is registered in advance at the user specifying section 130. The user specifying section 130 transmits genre information and user information to the recording section 21 by associating the genre information with the user information, so as to record the genre information and the user information in the recording section 21. The genre information is information about a picture being viewed, and the user information is obtained by specifying a user viewing the picture. The user specifying section 130 may cause the recording section 21 to delete data recorded before the past given time. The present embodiment discusses a case where the user specifying section 130 causes the recording section 21 to record and delete the data. However, another section may be provided in the main control section 100 or separately from the main control section 100, the another section managing data in which genre information about a picture viewed within a past given time and user information corresponding to a user who viewed the picture are associated with each other, the data being recorded in the recording section 21.

Note that the recording section 21 does not need to be integrated with the display device 10 but may be arranged separately from the display device 10.

The image quality adjusting section 22 supplies, to the display section 23, picture signals such as analog and digital broadcasting content, content recorded in a DVD, a BD, an HDD, and the like, and content obtained via a network. The image quality adjusting section 22 also adjusts an image quality of a picture signal in accordance with an image quality adjustment value obtained from the main control section 100. Then, the image quality adjusting section 22 supplies, to the display section 23, the picture signal thus adjusted.

The display section 23 displays a picture in accordance with the picture signal from the image quality adjusting section 22. Specifically, the display section 23 includes display elements such as an LCD, an EL display, and a PDP, and a driver circuit for driving the display elements in accordance with the picture signal thus received. Note that the picture encompasses not only a drawing, a graphic, and a letter but also a still image and a moving image.

The camera 25 is a photographing section which photographs a vicinity of the display device 10, so as to generate photographed image information. The camera 25 notifies the face extracting section 160 of the main control section 100 of the photographed image information.

The main control section 100 collectively controls various arrangements of the display device 10. Functions of the main control section 100 are carried out by causing a CPU (Central Processing Unit) to execute a program recorded in a recording device such as a RAM or a flash memory. The following description discusses the instruction obtaining section 110, the image quality setting section 120, the user specifying section 130, the genre obtaining section 140, the image quality adjustment instructing section 150, the face extracting section 160, and the image quality specifying section 170, each of which is provided in the main control section 100.

The instruction obtaining section 110 receives, from the remote control light receiving section 20, a user's instruction (remote control signal) given by operation of the remote controller 30. The instruction obtaining section 110 supplies the remote control signal to the image quality setting section 120, the user specifying section 130, the face extracting section 160, or the image quality specifying section 170 in accordance with the remote control signal thus received. Specifically, in a case where the remote control signal thus received is a signal related to a setting of an image quality adjustment value, the instruction obtaining section 110 supplies the remote control signal to the image quality setting section 120. In a case where the remote control signal thus received is a signal related to user registration, the instruction obtaining section 110 supplies the remote control signal to the image quality setting section 120. In a case where the remote control signal thus received is a signal related to user specification, the instruction obtaining section 110 supplies the remote control signal to the user specifying section 130. In a case where the remote control signal thus received is a signal for registering user facial information, the instruction obtaining section 110 supplies the remote control signal to the face extracting section 160. In a case where the remote control signal thus received is a signal indicative of an instruction to specify a user by use of the user facial information (a facial information extraction instruction), the instruction obtaining section 110 supplies the remote control signal to the face extracting section 160. In a case where the remote control signal thus received is a signal related to image quality specification, the instruction obtaining section 110 supplies the remote control signal to the image quality identifying section 170. The signal related to a setting of an image quality adjustment value is exemplified by a signal for displaying a screen (an image quality setting screen) in which an image quality adjustment value is set (a setting screen display instruction). The signal related to user registration is exemplified by a signal for registering a user name (user name registration instruction). The signal related to user specification is exemplified by a signal for specifying which user of registered users is viewing the display device (a user specifying instruction). The signal for registering user facial information is exemplified by a signal for registering user facial information (a facial information extracting instruction). The signal indicative of an instruction to specify a user by use of the user facial information is exemplified by a signal indicative of an instruction to specify a user by use of user facial information (a characteristic extracting instruction). A signal for recognizing a location of a remote controller is exemplified by a signal for selecting a favorite image quality from a plurality of images in accordance with a plurality of image qualities (an image quality specification instruction).

The image quality setting section 120 is means for setting an image quality adjustment value in accordance with a genre of a picture and registering user information while associating the user information with the image quality adjustment value thus set. Specifically, the image quality setting section 120 which has obtained the setting screen display instruction from the instruction obtaining section 110 notifies the image quality adjusting section 22 to display the image quality setting screen. The image quality setting section 120 which has received an image quality setting instruction generates an image quality adjustment value in accordance with the image quality setting instruction thus received. The image quality setting section 120 associates the image quality adjustment value thus generated with genre information and then records the image quality adjustment value as corresponding information in the recording section 21. In other words, when a user adjusts an image quality while viewing a picture, the image quality setting section 120 associates an image quality adjustment value in accordance with the adjustment with genre information obtained from the picture (the genre information obtaining section 140 obtains the genre information and then notifies the image quality setting section 120 of the genre information).

The image quality setting section 120 which has received, from the instruction obtaining section 110, an instruction to display a screen for registering a user name (user registration screen) causes the user registration screen to be displayed in accordance with the instruction thus received. The image quality setting section 120 obtains a user name in accordance with the user name registration instruction obtained from the instruction obtaining section 110.

The image quality setting section 120 receives, from the face extracting section 160, user facial information obtained by the face extracting section 160 in accordance with the facial information extraction instruction. The image quality setting section 120 records, in the recording section 21, data in which the user name and the user facial information which have been obtained are associated with the above corresponding information as user information for recognizing a user.

The user specifying section 130 is means for specifying to which piece of the user information recorded in the recording section 21 a user viewing the display device 10 corresponds. Specifically, the user identifying section 130 obtains user facial information from the face extracting section 160 in accordance with the user specification instruction obtained from the instruction obtaining section 110, and compares the user facial information thus obtained with the user facial information recorded in the recording section 21. Note that, since a method for the comparison is publicly known, a description thereof is omitted. As a result of the comparison, in a case where an agreement rate between any piece of the user facial information recorded in the recording section 21 and the user facial information obtained from the face extracting section 160 exceeds a value which has been set in advance (an agreement rate is high), the user specifying section 130 reads, from the recording section 21, a piece of the user information which piece includes the user facial information having a high agreement rate. The user specifying section 130 notifies the image quality adjustment instructing section 150 of the user information thus read.

Note that the user specifying section 130 may be arranged to (i) read an image quality adjustment value and notify the image quality adjustment instructing section 150 of the image quality adjustment value thus read and (ii) read, from the recording section 21, a user name associated with the user face information having the high agreement rate and notify the image quality adjusting section 22 to display the user name thus read.

The genre obtaining section 140 is means for obtaining image genre information from a picture signal supplied to the display device 10. Note that, in a case where the picture signal is digital broadcasting, genre information contained in EPG (Electronic Program Guide) data may be obtained. Alternatively, genre information may be obtained from characteristics of the picture signal. The genre obtaining section 140 notifies each of the image quality setting section 120, the image quality adjustment instructing section 150, and the image quality specifying section 170 of the genre information thus obtained.

The image quality adjustment instructing section 150 is means for instructing the image quality adjusting section 22 to adjust an image quality in accordance with an image quality adjustment value which is set by a user specified by the user specifying section 130 and is set for the genre information obtained by the genre obtaining section 140. Specifically, the image quality adjustment instructing section 150 receives, from the user specifying section 130, the user information of a user viewing the display device 10. The image quality adjustment instructing section 150 also receives, from the genre obtaining section 140, the genre information of the picture signal supplied to the display device 10. The image quality adjustment instruction section 150 reads, from the recording section 21, (i) the obtained user information of the respective plurality of users and (ii) an image quality adjustment value which is associated with the genre information. The image quality adjustment instructing section 150 notifies the image quality adjusting section 22 of the image quality adjustment value thus read.

The image quality adjustment instructing section 150 also notifies the image quality adjusting section 22 of an image quality adjustment value obtained from the image quality specifying section 170.

In order to register a face of a user, in response to the facial information extraction instruction obtained from the instruction obtaining section 110, the face extracting section 160 receives photographed image information from the camera 25 and extracts facial characteristics of the user (e.g., a contour of the face and where in the face the corner of eyes is located) from the photographed image information thus received. The face extracting section 160 notifies the image quality setting section 120 of information about the facial characteristics thus extracted as user facial information.

In order to specify a user, in response to the characteristic extraction instruction obtained from the instruction obtaining section 110, the face extracting section 160 receives photographed image information from the camera 25 and extracts facial characteristics of the user from the photographed image information thus received. The face extracting section 160 notifies the user specifying section 130 of information about the facial characteristics thus extracted as user facial information. Note that, since a method for extracting facial characteristics is publicly known, a description thereof is omitted.

The image quality specifying section 170 is means for specifying an image quality that meets preferences of a plurality of users viewing the display device 10. Assume that a plurality of users are specified by the user specifying section 130. The image quality specifying section 170 obtains, from the user specifying section 130, user information corresponding to the respective plurality of users viewing the display device 10. The image quality specifying section 170 also obtains, from the genre obtaining section 140, genre information of a picture signal supplied to the display device 10. The image quality specifying section 170 reads, from the recording section 21, (i) the obtained user information of the respective plurality of users and (ii) an image quality adjustment value which is associated with the genre information. The image quality specifying section 170 notifies the image quality adjustment instructing section 150 of a plurality of image quality adjustment values read from the recording section 21.

The image quality specifying section 170 finds an average of the plurality of image quality adjustment values read from the recording section 21. Then, the image quality specifying section 170 notifies the image quality adjustment instructing section 150 of the found average of the plurality of image quality adjustment values.

The image quality specifying section 170 extracts, from data which is recorded in the recording section 21 and in which genre information of an image viewed within a past given time and user information corresponding to a user having viewed the image are associated with each other, user information which is the most associated with genre information obtained from the genre obtaining section 140. Then, the image quality specifying section 170 notifies the image quality adjustment instructing section 150 of an image quality adjustment value corresponding to the user information.

In accordance with the image quality specifying instruction obtained from the instruction obtaining section 110, the image quality specifying section 170 specifies, as an image quality adjustment value for a plurality of users, an image quality adjustment value of a picture which has been selected by user operation from a plurality of pictures whose image qualities have been adjusted. Then, the image quality specifying section 170 notifies the image quality adjustment instructing section 150 of the image quality adjustment value thus specified. This enables a picture to be displayed in an image quality which meets preferences of a respective plurality of users viewing the display device 10.

[Operation of Main Control Section 100]

Figure 3:
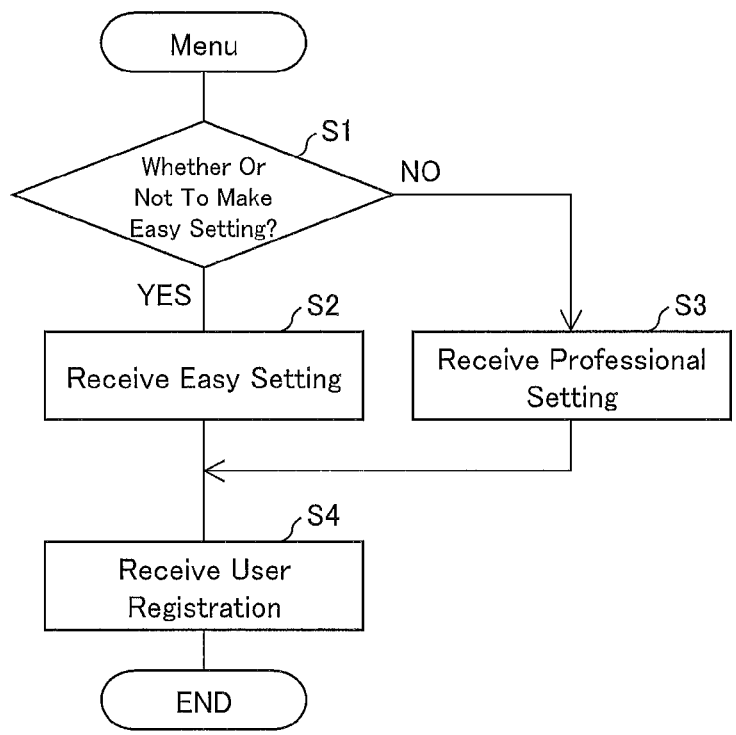
FIG. 3

The following description discusses operation of the main control section 100 related to an image quality and a user setting with reference to the FIGS. 3 to 7. FIG. 3 is a flowchart showing how the main control section 100 of the display device 10 in accordance with the present embodiment carries out a process related to an image quality and a user setting.

(Image Quality/User Setting Process)

The image quality setting section 120 which has been instructed to display a menu screen for setting an image quality adjustment value displays, in the display section 23, a selection screen for selecting whether or not to make an easy setting (step S1) (see FIG. 3). In a case where a user chooses to make the easy setting (YES at step S1), the image quality setting section 120 receives user's operation of the "easy setting" (step S2).

Note here that the "easy setting" is a setting method described below. According to this method, a plurality of sample images whose image qualities have been adjusted in accordance with a plurality of pieces of image quality information (image quality adjustment values adapted in advance to sample images for making the easy setting) are displayed in the display section 23. An image quality adjustment value is set in accordance with a piece of image quality information of one (1) image selected by a user from the plurality of sample images. As described above, presenting sample images enables users to select their respective favorite images intuitively.

More specifically, according to the present embodiment, the easy setting is made for three types of genres by presenting three sample images for each of the three types of genres. The three types of genres are "film", "video", and "sport". The "film" is a genre which derives from a film and is obtained by subjecting content photographed at 24 Hz to a 3:2 pull-down process. The "video" is a genre of content which derives from normal broadcasting at 60 Hz. The "sport" is a genre of content with which genre information of sport is associated by EPG data. The sample images are adjusted by respective different patterns. Note that genre information is not limited to the three types, "video", "film", and "sport". The genre information may be arranged so that various genres such as "news/report", "information/gossip show", "variety show", and "movie" can be discriminated.

Three sample images are subjected to adjustments in color saturation, sharpness, and gamma from patterns 1 to 3. The three sample images which have been processed by the patterns 1 to 3 are displayed for each of the genres. The image quality setting section 120 records, in the recording section 21, information of the displayed three images a corresponding one of which is selected for each of the genres, while associating the information of the three images with respective pieces of the genre information.

Note that, in the example described here, the pattern 2 is a pattern which is recommended by a manufacturer and carries out a standard adjustment in image quality. The pattern 1 carries out a so-called "light" image quality adjustment, whereas the pattern 3 carries out a so-called "deep" image quality adjustment. The "light" means, for example, a mild color tone in terms of color saturation, a vaguer outline and a mild picture tone in terms of sharpness, and a straight line or a weaker S-characteristic in terms of gamma. In contrast, the "deep" means, for example, a brighter color tone in terms of color saturation, a clearer outline in terms of sharpness (0 is an initial value, and sharpness becomes stronger as a + value increases), and a stronger S-characteristic in terms of gamma.

The above description discusses the embodiment in which sample images are presented during the easy setting. Alternatively, the sample images may be replaced by a caption such as "Which color saturation would you like, (1) light, (2) standard, or (3) deep?". As described above, it is only necessary that an image adjusted by candidate image quality information or a caption be displayed during the easy setting.

When a user chooses not to carry out the easy setting (NO at step S1), the image quality setting section 120 receives user's operation of "professional setting" (step S3). Note here that the "professional setting" is a setting method in which a user sets an image quality adjustment value in accordance with a user's preference more finely than in the easy setting. Namely, the "professional setting" is suitable for a user who has more detailed knowledge about an image quality.

In response to a selection of a target genre of the professional setting, an adjustment bar for adjusting a luminance level, a black level, a color depth, a color tone, and sharpness is displayed on a screen for adjusting parameters of an image quality. A user causes a remote controller to send an instruction to adjust each of parameters. The image quality setting section 120 records, in the recording section 21, values of the respective parameters (image quality adjustment values) thus adjusted while associating each of the values with genre information. Note that the present embodiment takes, as an example of a parameter for adjusting an image quality, a luminance level, a black level, a color depth, a color tone, and sharpness. However, the parameter is not limited to these. Note also that the present embodiment takes, as an example, the arrangement in which the professional setting is made in a case where the easy setting is not made. However, the present invention is not limited to this. For example, the present invention may employ an arrangement such that the professional setting is further made after the easy setting is made.

Figure 4:
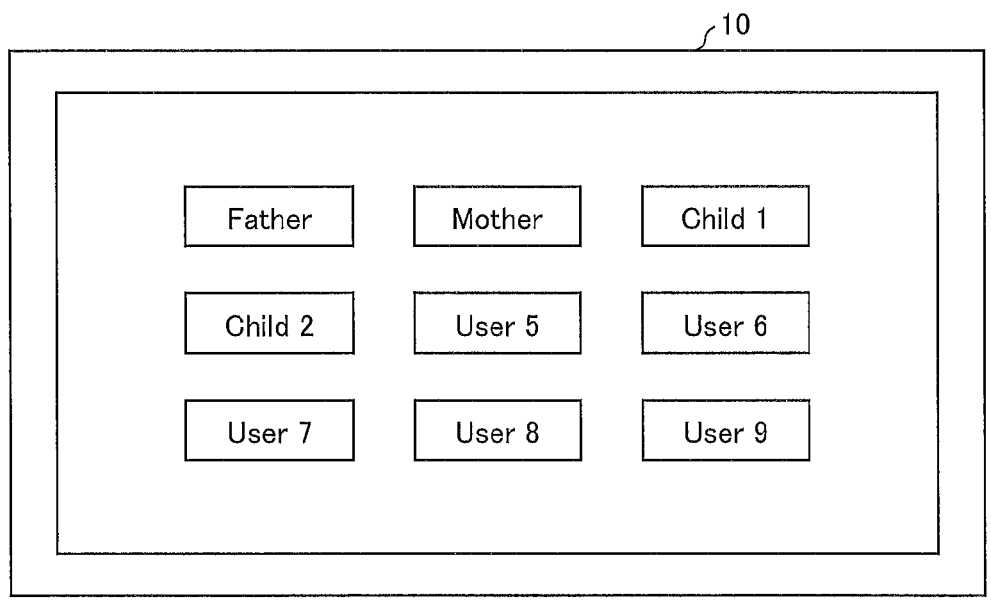
FIG. 4

After carrying out the easy setting (step S2) or the professional setting (step S3), the image quality setting section 120 receives operation of user registration (step S4). FIG. 4 shows an example of a user registration screen in the present embodiment. The image quality setting section 120 receives an input of a user name which input is made by operating the remote controller 30 (see FIG. 4). The user name is exemplified by a father, a mother, a child 1, and a child 2. However, the user name is not limited to these. The image quality setting section 120 also receives user facial information of which the face extracting section 160 notifies the image quality setting section 120. The image quality setting section 120 records the user name whose input has been received and the user facial information in the recording section 21 while associating each of the user name and the user facial information with an image quality adjustment value for each genre, the image quality adjustment value having been recorded at the steps S2 and S3. Note that the present embodiment discusses an arrangement in which the image quality setting section 120 receives an input of a user name. However, the present invention, which is not limited to this, may be arranged such that a user name which is preset is selected.

FIG. 5 shows an example of image information which has been set for each user by the easy setting. The recording section 21 records users having been set at the step S4, and the recording section 21 also records one of three sample images with respect to each of three genres which have been set at the step S2 so as to be associated with each of the users (see FIG. 5).

Furthermore, FIG. 6 shows an example of image quality adjustment values which have been set for each user by the professional setting. The recording section 21 records the users having been set at the step S4. The recording section 21 also records image quality adjustment values for each of three types of genres which have been set at the step 3 so as to be associated with each of the users (see FIG. 6).

Figure 7:
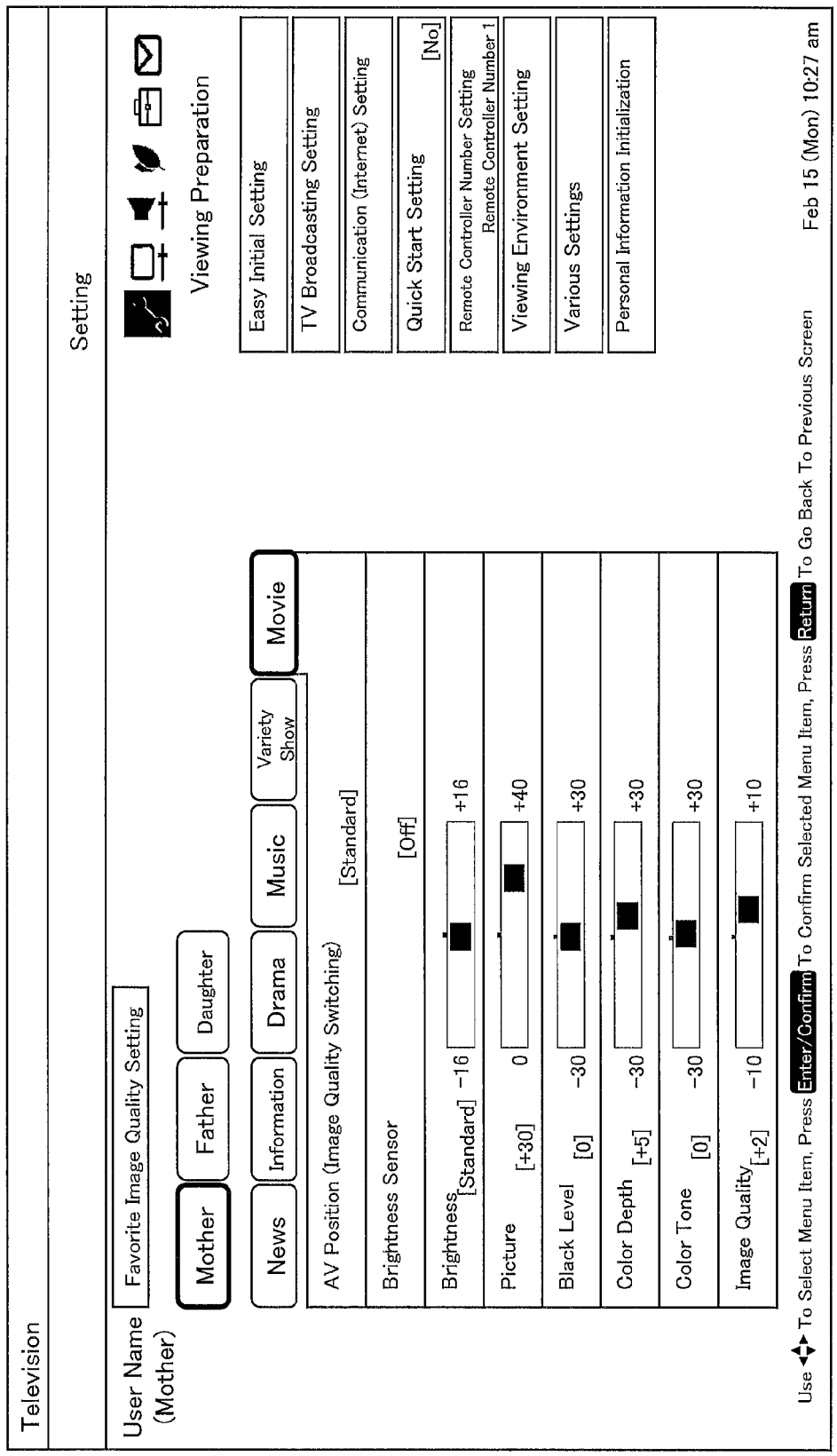
FIG. 7

FIG. 7 shows an example in which image quality adjustment values having been set for each user by the easy setting or the professional setting are displayed in the display device 10. In the example shown in FIG. 7, a mother, a father, and a daughter are registered as three user names. Genre information consists of six types of genres, "news", "information", "drama", "music", "variety show", and "movie".

The display device 10 displays image quality adjustment values in a case where the user name is "mother" and the genre information is "movie" (see FIG. 7). A set image quality adjustment value is thus recorded for each user and for each genre information.

Note that the genre information is not limited to the above six types of genres. Alternatively, the genre information may be arranged so that various genres can be discriminated.

(User Specification Process)

Figure 8:
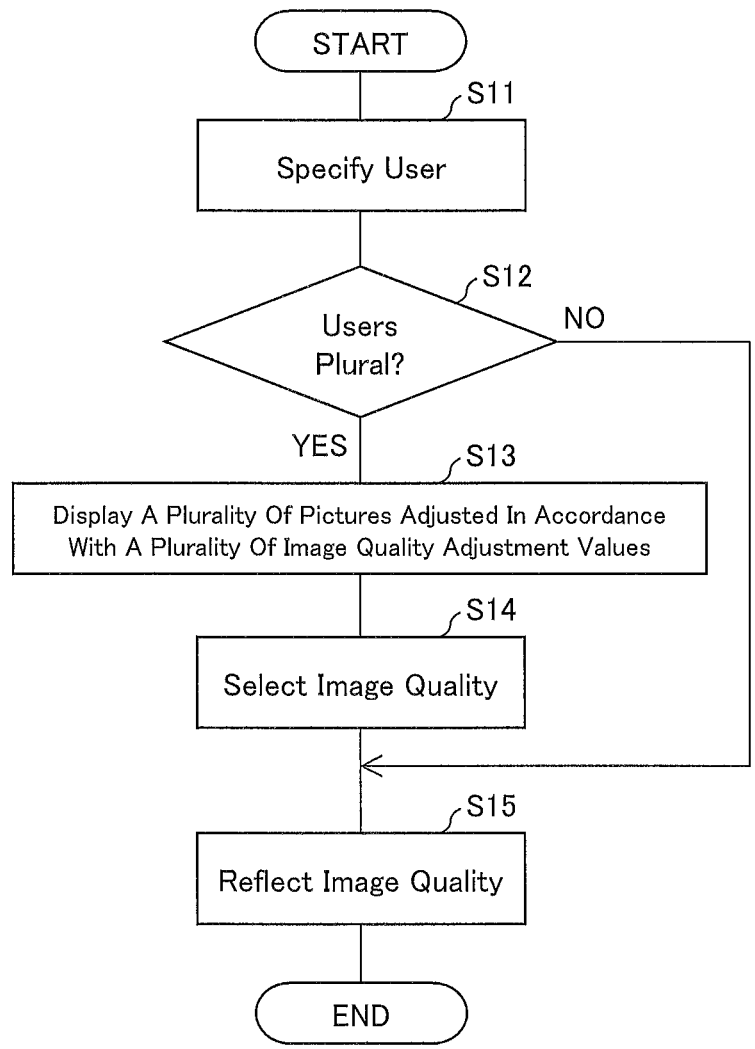
FIG. 8

The following description discusses, with reference to FIG. 8, how the main control section 100 carries out operation related to a user specification process. FIG. 8 is a flowchart showing how the main control section 100 of the display device 10 carries out a process related to user specification (user specification step).

The user specifying section 130 which has obtained a user specification instruction receives photographed image information from the camera 25, so that a user viewing the display device 10 is specified in accordance with the photographed image information thus received. Then, in accordance with user facial information which is supplied from the face extracting section 160, the user specifying section 130 specifies user information of a user of all registered users, the user information containing user facial information which corresponds to the user facial information which is supplied from the face extracting section 160 (Step S11) (see FIG. 8).

The user specifying section 130 which has specified a user viewing the display device 10 determines the number of users thus specified (step S12).

Assume that a plurality of users view the display device 10 (Yes at the step S12). The image quality specifying section 170 obtains, from the user specifying section 130, user information of the plurality of users who have been specified. The image quality specifying section 170 also obtains, from the genre obtaining section 140, genre information indicative of a genre of a picture signal having been supplied to the display device 10. Then, the image quality specifying section 170 reads, from the recording section 21, a plurality of image quality adjustment values corresponding to the user information of the plurality of users and the genre information. The image quality specifying section 170 notifies the image quality adjustment instructing section 150 of the plurality of image quality adjustment values thus read from the recording section 21. The image quality adjustment instructing section 150 instructs the image quality adjusting section 22 to adjust an image quality in accordance with the plurality of image quality adjustment values which have been obtained from the image quality specifying section 170 (image quality specification step). In accordance with the plurality of image quality adjustment values, the image quality adjusting section 22, adjusts the picture signal having been supplied to the display device 10, and displays a plurality of pictures in the display section 23 (step S13; image quality adjustment instruction step).

The image quality specifying section 170 obtains an image quality adjustment value of a picture having been selected by operation of the remote controller 30 from the plurality of pictures which have been adjusted in accordance with the plurality of image quality adjustment values at the step S13. Then, the image quality specifying section 170 notifies the image quality adjustment instructing section 150 of the image quality adjustment value thus obtained (step S14).

In accordance with the image quality adjustment value having been obtained at the step S14, the image quality adjustment instruction section 150 adjusts the picture signal having been supplied to the display device 10, and displays, in the display section 23, the picture signal thus adjusted. In a case where one (1) user views the display device 10 (No at step S12), the image quality adjustment instruction section 150 reads, from the recording section 21, an image quality adjustment value corresponding to user information of the one (1) user thus specified and genre information having been obtained from the genre obtaining section 140. Then, in accordance with the image quality adjustment value thus read, the image quality adjustment instruction section 150 adjusts the picture signal having been supplied to the display device 10, and displays, in the display section 23, the picture signal thus adjusted (step S15).

Such an arrangement allows a user to save trouble of selecting which user among registered users is viewing the display device 10.

Note that image quality adjustment values are set for a plurality of users. Therefore, it is possible to provide a picture having an image quality which meets preferences of the respective plurality of users.

(Specific Examples of Method for Displaying a Plurality of Picture Signals)

Figure 9:
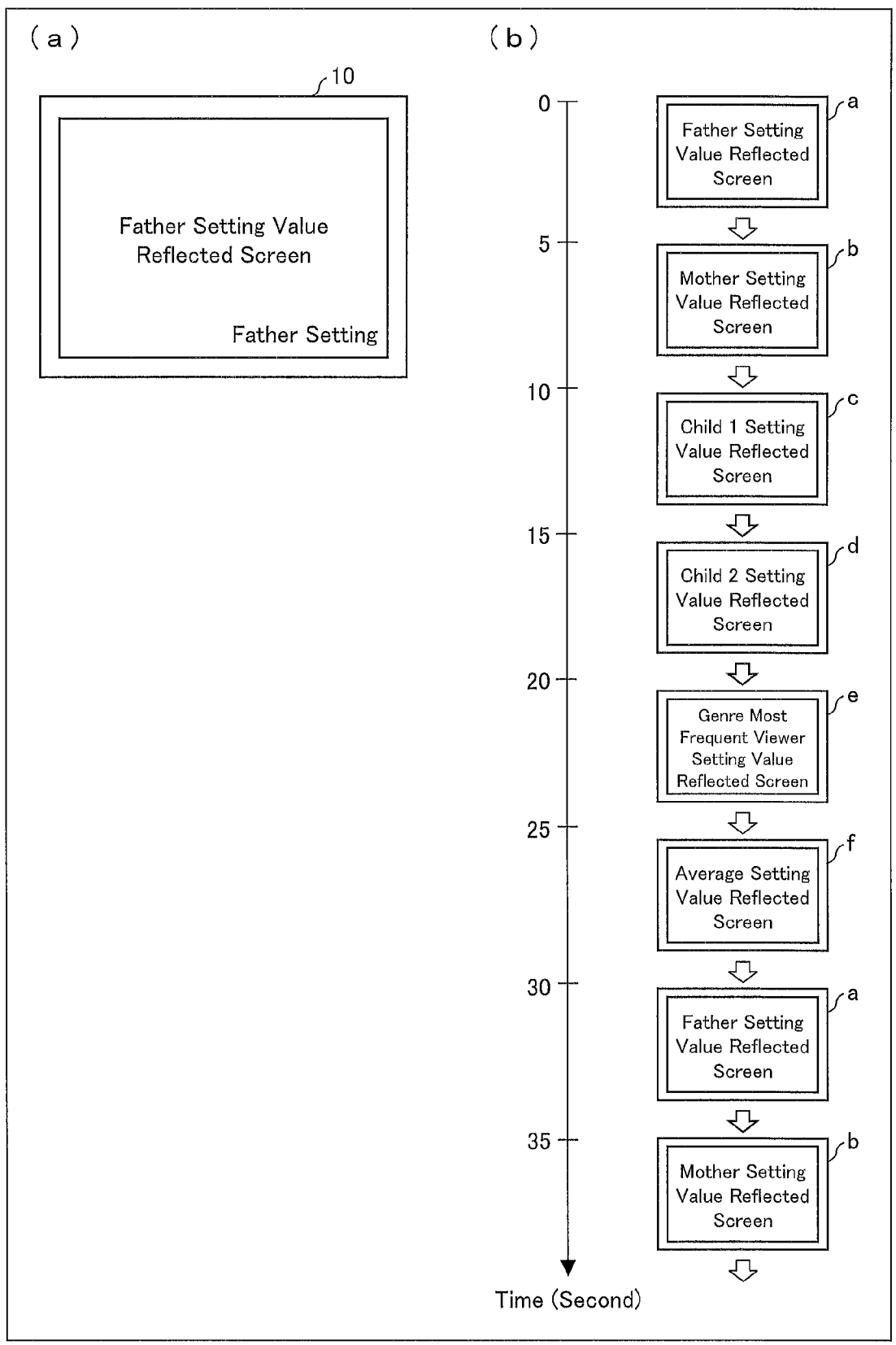
FIG. 9
Figure 10:
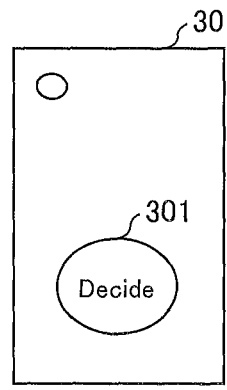
FIG. 10
Figure 11:
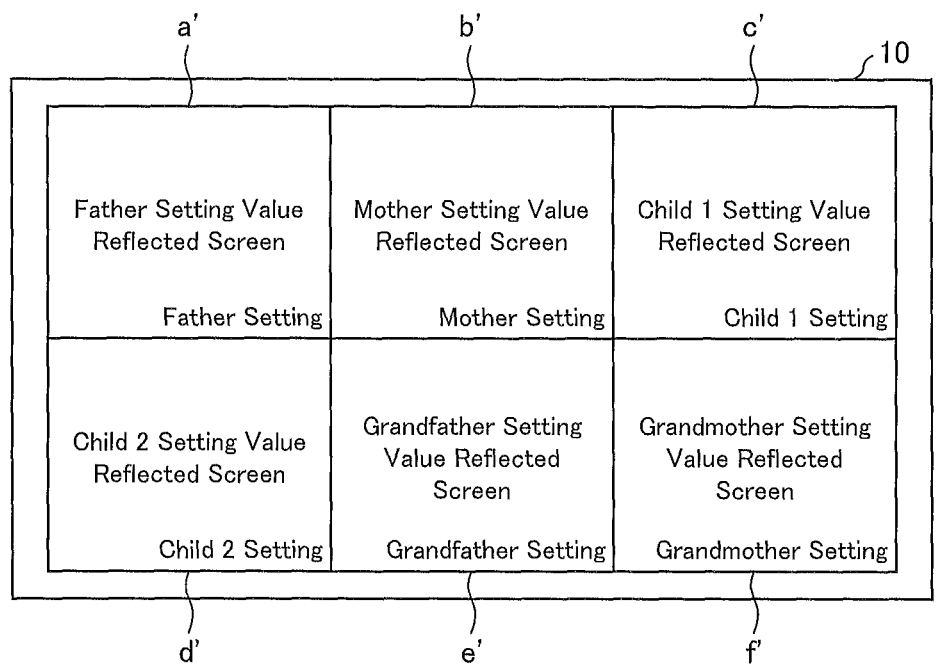
FIG. 11

The following description discusses, with reference to FIGS. 9 to 11, a specific example in which a plurality of pictures having been adjusted in accordance with a plurality of image quality adjustment values are displayed at the step 13.

Each of the image quality specifying section 170 and the image quality adjustment instructing section 150 carries out either one of specification methods described in (Specific Example 1) and (Specific Example 2) below.

SPECIFIC EXAMPLE 1

The following description discusses a first example of a method for sequentially displaying, in the display section 23, a plurality of picture signals which have been adjusted in accordance with image quality adjustment values that are set by users viewing the display device 10.

In the present example, the following description takes, as an example, a case where four users W through Z view the display device 10 and their user names are specified as "father", "mother", "child 1", and "child 2", respectively (see FIG. 2).

FIG. 9 shows an example of how to display a selection screen in which an image quality setting that meets preferences of a respective plurality of users is selected by use of pictures whose image qualities have been adjusted in accordance with image quality adjustment values of respective users. (a) of FIG. 9 shows an example of a case where a picture whose image quality has been adjusted in accordance with an image quality adjustment value of "father" is displayed in the display device 10. (b) of FIG. 9 shows an example of how to sequentially display a plurality of screens whose image qualities have been adjusted in accordance with image quality adjustment values of respective users.

A picture in which the image quality adjustment value of the father is reflected is displayed in the display device 10 (see (a) of FIG. 9). Hereinafter, a screen in which a picture whose image quality has been adjusted in accordance with the image quality adjustment value of the father is displayed is referred to as a "father setting screen".

Furthermore, a message which indicates that the father setting screen is being displayed, e.g., "father setting" is displayed on the lower right of a screen (see (a) of FIG. 9). Note that a location of the message to be displayed is not limited to this. Note also that the message to be displayed is not limited to this.

(b) of FIG. 9 shows an example of screens in which the picture which is shown in (a) of FIG. 9 and whose image qualities have been adjusted in accordance with the image quality adjustment value of the user is sequentially displayed for a given period. A vertical axis of (b) of FIG. 9 shows a time (second).

A mother setting screen (screen b) is displayed five seconds after the father setting screen (screen a) is displayed, a child 1 setting screen (screen c) is displayed five seconds after the mother setting screen is displayed, and a child 2 setting screen (screen d) is displayed five seconds after the child 1 setting screen is displayed (see (b) of FIG. 9). After pictures whose image qualities have been adjusted in accordance with image quality adjustment values of respective all the users viewing the display device 10 have been displayed, a genre most frequent viewer setting screen (screen e) is displayed (such a screen setting is referred to as a "genre most frequent viewer setting"). The genre most frequent viewer setting screen is obtained by adjusting an image quality in accordance with an image quality adjustment value associated with user information which is recorded in the recording section 21 and is indicative of a user who views most frequently a program of a genre being viewed currently (a user corresponding to the user information is a "most frequent viewer"). In addition, an average image quality adjustment value screen (screen f) is displayed. The average image quality adjustment value screen is obtained by adjusting an image quality in accordance with an average of image quality adjustment values of respective users who are viewing the display device 10. After the screen f is displayed, the screens a to f are repeatedly displayed.

FIG. 10 shows an arrangement of the remote controller 30. The remote controller 30 includes a decision button 301 (see FIG. 10).

A user presses the decision button 301 when among the screens a to f shown in (b) of FIG. 9, a screen having an image quality which meets a user's preference is displayed. This enables specification of an image quality which meets preferences of respective all the users. For example, in a case where the child 2 setting screen (screen d) meets the preferences of all the users, a user presses the decision button 301 while the screen d is being displayed. As a result, the display section 23 stops displaying the selection screens shown in (b) of FIG. 9, and displays the screen d. Namely, the display section 23 stops displaying the selection screens shown in (b) of FIG. 9 after one (1) image quality has been specified, and displays a picture whose image quality has been adjusted to the one (1) image quality thus specified.

Note that the present example discusses an example in which the selection screens are switched every five seconds. However, a timing at which the selection screens are switched is not limited to this. It is only necessary to set the timing so that users can check a screen which has been adjusted in accordance with an image quality that meets their preferences.

The above description of the present example assumes that the selection screens are switched in the order of "father setting screen", "mother setting screen", "child 1 setting screen", "child 2 setting screen", "genre most frequent viewer setting screen", and "average image quality adjustment value screen". However, an order in which the selection screens are switched is not limited to this.

In addition, the present example discusses a method of displaying screens which have been adjusted by using not only image quality adjustment values of users viewing the display device 10 but also a genre most frequent viewer setting and an average of image quality adjustment values of respective users viewing the display device 10. However, an image quality adjustment value is not limited to this. For example, an average of image quality adjustment values associated with all the user information recorded in the recording section 21, or a manufacturer's recommended value may be used as an image quality adjustment value.

SPECIFIC EXAMPLE 2

The following description discusses a second example of a method for simultaneously displaying, in the display section 23, a plurality of image signals which have been adjusted in accordance with image quality adjustment values of respective all the users viewing the display device 10.

In the present example, the following description takes, as an example, a case where six users view the display device 10 and their user names are specified as "father", "mother", "child 1", "child 2", "grandfather", and "grandmother".

FIG. 11 shows an example of how pictures whose image qualities have been adjusted in accordance with image quality adjustment values of respective users are displayed in respective regions into which a display region of the display section 23 has been divided.

A display region of the display device 10 is divided into six regions (see FIG. 11). A father setting screen (screen a') is displayed in the region on the upper left of a screen of the display device 10. A mother setting screen (screen b') is displayed in a region on the right of the father setting screen. A child 1 setting screen (screen c') is displayed in a region on the upper right of the screen. A child 2 setting screen (screen d') is displayed in a region on the lower left of the screen. A grandfather setting screen (screen e') is displayed in a region on the right of the child 2 setting screen. A grandmother setting screen (screen f') is displayed in a region on the lower right of the screen. A message which indicates whose setting screen is being displayed, e.g., "father setting", is displayed on the lower right of each of the regions. Note that a location of the message to be displayed is not limited to this. Note also that the message to be displayed is not limited to this.

A user selects, among the screens a' to f' shown in FIG. 11, a screen that meets a user's preference, and presses the decision button 301, so that one (1) picture quality is specified. For example, in a case where the child 2 setting screen (screen d') meets preferences of all the users, a user selects the screen d' and presses the decision button 301. This enables a full-screen display of the screen d'.

Namely, the display section 23 stops displaying the selection screens shown in FIG. 11 after one (1) image quality has been specified, and displays a picture whose image quality has been adjusted to the one (1) image quality thus specified.

Note that the present example discusses a case where a screen has been divided into six regions. However, how to divide a screen is not limited to this.

The above description of the present example assumes that setting screens to be displayed in respective regions are "father setting screen", "mother setting screen", and "child 1 setting screen" from the upper left to the upper right, and "child 2 setting screen", "grandfather setting screen", and "grandmother setting screen" from the lower left to the lower right. However, how to arrange these setting screens is not limited to this.

In addition, the present example discusses a method of displaying setting screens of respective users who are viewing the display device 10. However, an image quality adjustment value is not limited to this. For example, an average of image quality adjustment values which are associated with all the user information recorded in the image quality adjustment value of the genre most frequent viewer may be displayed.

Note that the present embodiment discusses an arrangement in which a user name and user facial information are recorded as user information so that the user information is associated with an image quality adjustment value. However, the present invention is not limited to this. For example, the present invention may employ an arrangement such that no user name is recorded but user facial information and an image quality adjustment value are recorded so as to be associated with each other.

The present embodiment discusses an arrangement in which a user is specified by using user facial information. However, the present invention is not limited to this.

<Second Embodiment>

Figure 12:
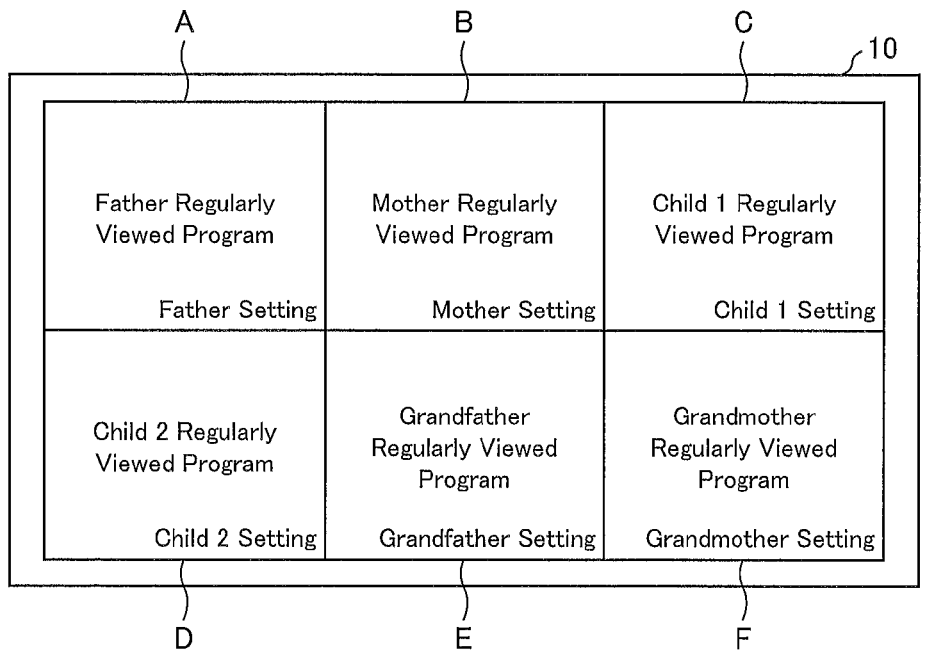
FIG. 12
Figure 13:
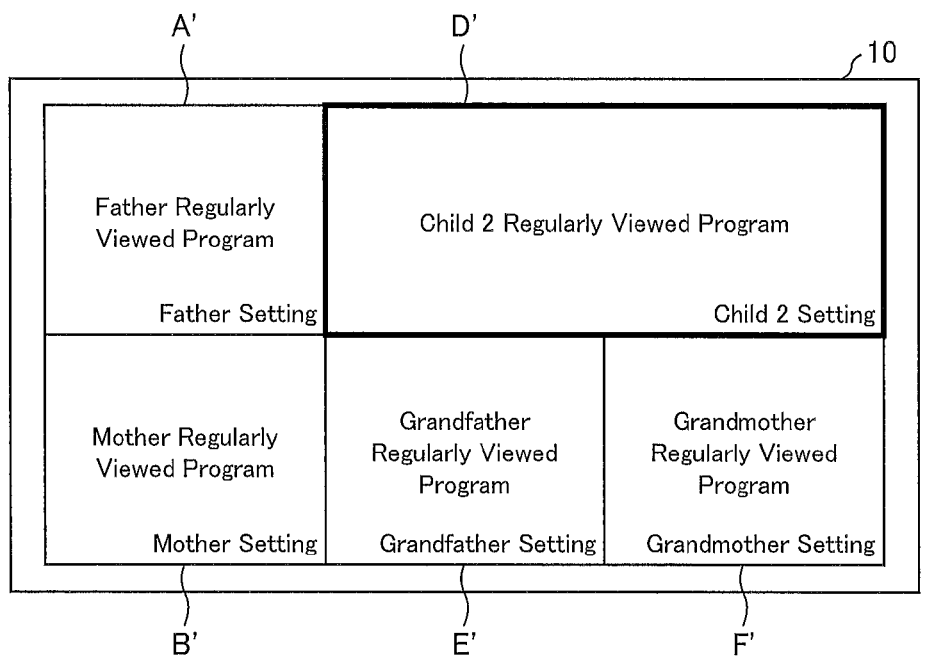
FIG. 13

The following description discusses a second embodiment of the present invention with reference to FIGS. 12 and 13.

The first embodiment discusses a method in which, in a case where a plurality of users view an identical program, the plurality of users view an image whose image quality has been adjusted to an image quality which meets preferences of respective all users. However, the present invention is not limited to this. Namely, according to the present invention, it is possible for a plurality of users to view respective different programs which differ in image quality. The second embodiment discusses a display method of the display device 10 that is capable of displaying so-called multi-channel broadcasting in a case where a plurality of users view respective different programs which differ in image quality.

FIG. 12 shows an example of a screen in which (i) image quality adjustment values of respective users are reflected in respective regions into which a display region of the display section 23 (see FIG. 11) has been divided and (ii) regularly viewed programs of the respective users are displayed in the respective regions.

Note here that a regularly viewed program of a user is a program which the user frequently views. The regularly viewed program is exemplified by "news" serving as a regularly viewed program of a father, "drama" serving as a regularly viewed program of a mother, and the like. The regularly viewed program may be a program which a user has recorded in advance as a regularly viewed program in the recording section 21. Alternatively, a picture which a user viewed most frequently within a past given time period may serve as the regularly viewed program in accordance with data which is recorded in the recording section 21 and in which (i) genre information of the picture that was viewed within the past given time period and (ii) user information corresponding to the user who viewed the picture are associated with each other.

FIG. 13 shows an example of a display screen which is obtained in a case where a child 2 setting screen (screen D') is displayed by combining a child 1 setting screen (screen C) and a child 2 setting screen (screen D) which are shown in FIG. 12.

For example, if the child 1 and the child 2 are identical not only in regularly viewed program but also in image quality adjustment value, it is possible to provide a larger display as in the case of the screen D' by combining the screen C and the screen D.

Similarly, also in a case where the child 1 and the child 2 differ not only in regularly viewed program but also in image quality adjustment value, or in a case where the child and the child 2 view an identical program having an identical quality, it is possible to provide a larger display by combining the two screens.

As described earlier, users can view their respective favorite programs whose image qualities meet their respective preferences. Therefore, it is possible for the display device 10 to provide a picture that meets preferences of all users who are viewing the display device 10.

FIGS. 12 and 13 explain that each of the regions displays a regularly viewed program of each of the users. However, a program to be displayed is not limited to this, and may be altered depending on a user's preference.

This makes it possible to provide a user's favorite picture whose image quality meets a preference of a user who is viewing the display device 10.

[Another Embodiment]

Figure 14:
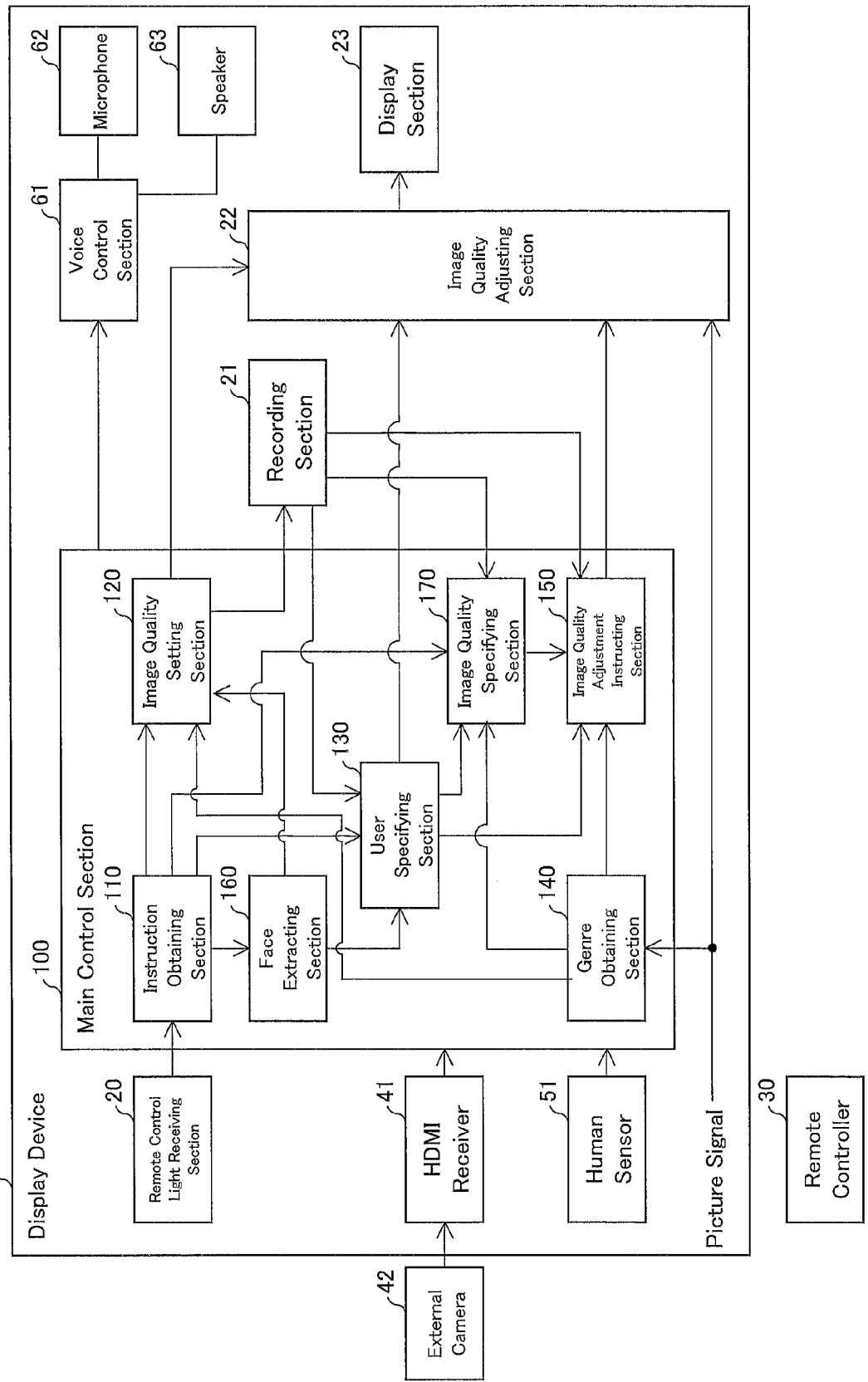
FIG. 14

Each of First Embodiment and Second Embodiment discusses an embodiment in which the display device (television receiver) 10 causes the camera 25 provided therein to photograph a user's face. However, the present invention is not limited to this. For example, the display device 10 may be connected with an external camera 42 via an HDMI receiver 41 by interface means in conformity with the HDMI standard (see FIG. 14). Note that FIG. 14 shows a case where the HDMI standard is employed. However, the connection may be made by interface means in conformity with the USB standard, the Wi-Fi standard, the DLNA communication standard, or the like.

Figure 15:
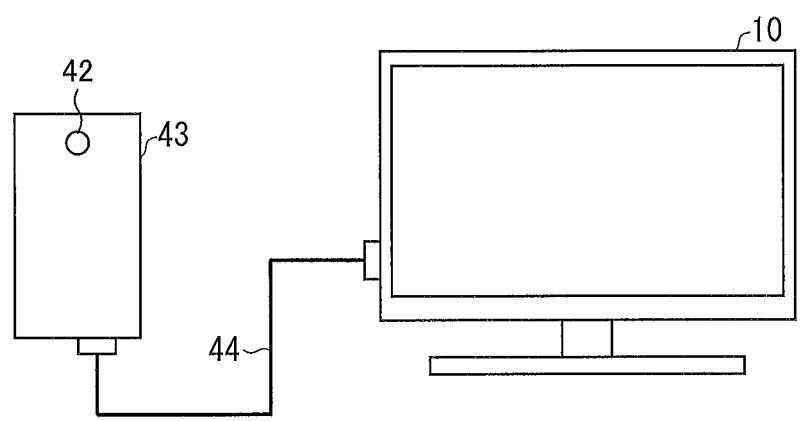
FIG. 15

The external camera 42 may be a camera which is provided in a camera mobile phone 43 (see FIG. 15). In FIG. 15, the camera mobile phone 43 is connected with the display device 10 via an HDMI cable 44. Note that a transmission line may be either wired or wireless.

In addition, it is possible to detect a face of a user with higher accuracy by using both the camera 25 included in the main body of the display device 10 and the external camera 42 in combination, and specifying a viewing location of the user.

The display device 10 may also include a human sensor 51 (see FIG. 14). Alternatively, the display device 10 may include a gaze detection sensor instead of the human sensor 51 or may include the gaze detection sensor in addition to the human sensor 51. In a case where the display device 10, which includes the human sensor 51 and/or the gaze detection sensor and detects a human motion and/or a gaze, is controlled via the main control section 100 so that the display device 10 causes a camera to carry out photographing only when a user is present, the display device 10 can consume less electric power for driving the camera included in the main body of the display device 10.

A main body of the camera 25 may be of a rotation and tracking drive type. In this case, the camera 25 may be arranged to photograph a face of a user by causing the main body and the human sensor 51 to operate simultaneously and track a user in a direction in which the user moves.

The display device 10 may be arranged to allow implementation of a function of Skype (Registered Trademark) by being connected to the Internet and installing thereinto software of Skype (Registered Trademark). In this case, it is preferable that the display device 10 further include a voice control section 61, a microphone 62, and a speaker 63 (see FIG. 14). In a case where software for implementing a function of Skype (Registered Trademark) is installed into the main control section 100, a user can use the function of Skype (Registered Trademark). Specifically, it is only necessary that the display device 10 be arranged as below. (i) The user's image which has been photographed by the external camera 42 (or the camera 25 which is described in the first embodiment and is a built-in camera provided in the display device 10) and (ii) the user's voice which has been inputted through the microphone 62 are transmitted via the Internet to a person to whom the user is speaking. Then, the person's image which has been transmitted from the person is displayed in the display section 23. Subsequently, the person's voice is released from the speaker 63 of the main body of the display device 10 or from a headphone (not illustrated) which is externally connected to a headphone terminal (not illustrated) of the main body of the display device 10.

<Program and Recording Medium>

Finally, each block included in the display device 10, especially the main control section 100, may be realized by a logic circuit formed on an integrated circuit (IC chip) by means of hardware. Alternatively, the each block may also be realized by a CPU (Central Processing Unit) by means of software.

In the latter case, the display device 10 includes (i) a CPU which executes a command of a program that implements each function of the display device 10, (ii) a ROM (Read Only Memory) in which the program is stored, (iii) a RAM (Random Access Memory) which extracts the program, (iv) a storage device (a recording medium) such as a memory in which the program and various sets of data are stored, and the like. The object of the present invention can also be achieved by (i) supplying, to the display device 10, a recording medium in which program codes (an executable program, an intermediate code program, and a source program) of a control program of the display device 10, the control program being software that implements the each function, are computer-readably recorded, and (ii) causing the computer (or a CPU or an MPU) to read and carry out the program codes recorded in the recording medium.

Examples of the recording medium include (i) tapes such as a magnetic tape and a cassette tape, (ii) disks including magnetic disks such as a floppy (Registered Trademark) disk and a hard disk, and optical disks such as a CD-ROM, an MO, an MD, a DVD, and a CD-R (iii) cards such as an IC card (including a memory card) and an optical card, (iv) semiconductor memories realized by a mask ROM, EPROM, EEPROM, a flash ROM, (v) logical circuits such as a PLD (programmable logic device) and an FPGA (field-programmable gate array), and (vi) the like.

In addition, the display device 10 may be arranged to be connectable to a communication network, so as to supply thereto the program codes via a communication network. It is only necessary that the communication network be capable of transmitting the program codes, and the communication network is not particularly limited. Examples of the communication network includes the Internet, an intranet, an extranet, a LAN, ISDN, VAN, a CATV communications network, a virtual private network, a telephone network, a mobile telecommunications network, and a satellite communication network. Furthermore, it is only necessary that a transmission medium of the communication network be capable of transmitting the program codes. The transmission medium is not limited to a transmission medium of a specific type or form. Examples of the transmission medium includes wired transmission media such as IEEE1394, a USB, a power-line carrier, a cable TV circuit, a telephone line, and ADSL (Asymmetric Digital Subscriber Line) and wireless transmission media such as infrared communication systems such as IrDA and a remote controller, Bluetooth (Registered Trademark), IEEE802.11 wireless communication system, HDR (High Data Rate), NFC (Near Field Communication), DLNA (Digital Living Network Alliance), a mobile phone network, a satellite circuit, and a digital terrestrial network.

The present invention is not limited to the description of the embodiments above, but may be altered by a skilled person within the scope of the claims. An embodiment based on a proper combination of technical means disclosed in different embodiments is encompassed in the technical scope of the present invention.

<Addition>

The display device in accordance with the present invention is preferably arranged to further include: a photographing section which photographs a vicinity of the display device and generates photographed image information; and face extracting means for obtaining the photographed image information from the photographing section, and obtaining, in accordance with the photographed image information, user facial information indicative of a characteristic of a face of a user, the user specifying means specifying the user by comparing (i) the user facial information obtained by the face extracting means and (ii) user facial information which is recorded in the recording section and is associated with the user information.

According to the above arrangement, it is possible for the display device to specify, in accordance with images photographed by the photographing section, a plurality of users viewing the display device. This allows easy specification of the plurality of users.

The display device in accordance with the present invention is preferably arranged such that: the image quality specifying means specifies, as a setting value for specifying an image quality, each of the plurality of setting values which correspond to the respective plurality of users; and the image quality adjustment instructing means instructs the image quality adjusting section to cause the display section to sequentially display pictures having respective image qualities that are in accordance with the respective plurality of setting values which correspond to the respective plurality of users.

According to the above arrangement, it is possible for the display device to sequentially display a plurality of pictures at respective image qualities in accordance with respective setting values which have been set in advance by a respective plurality of users.

The display device in accordance with the present invention is preferably arranged to further include: genre obtaining means for obtaining, from the pictures, genre information indicative of genres of the respective pictures, the recording section recording (i) data in which the plurality of setting values, the user information, and the genre information are associated with each other and (ii) data in which genre information of a picture having been viewed within a past given time period and user information that corresponds to a user having viewed the picture are associated with each other, the image quality specifying means specifying, as a setting value for specifying an image quality, a setting value which is associated with user information that is, of all user information recorded in the recording section, most associated with genre information corresponding to a picture which is being supplied to the display device, and the image quality adjustment instructing means instructing the image quality adjusting section to cause the display section to display, in addition to the pictures which are sequentially displayed in the display section, a picture having an image quality that corresponds to the setting value thus specified.

Note here that the data which is recorded in the recording section and in which genre information of a picture having been viewed within a past given time period and user information that corresponds to a user having viewed the picture are associated with each other shows how frequently a user corresponding to the user information views a picture of a specific genre. That is, the data shows that a user corresponding to user information which is most associated with genre information corresponding to a picture which is being supplied to the display device is a user who views the picture of the specific genre most frequently (hereinafter referred to as "most frequent viewer").

In other words, the arrangement allows the display device to (i) display a picture at an image quality which is in accordance with a setting value of the most frequent viewer and (ii) display, in addition to the pictures which are sequentially displayed in the display section, a picture whose image quality is in accordance with a setting value of the most frequent viewer.

The display device in accordance with the present invention may be arranged such that: the image quality specifying means specifies, as a setting value for specifying an image quality, an average of the plurality of setting values thus obtained; and the image quality adjustment instructing means instructs the image quality adjusting section to cause the display section to display, in addition to the pictures which are sequentially displayed in the display section, a picture having an image quality that corresponds to the average thus specified.

The above arrangement enables the display device to display a picture at an image quality which is in accordance with an average of the plurality of setting values which have been set in advance by a respective plurality of users. Accordingly, the display device can display, in addition to the pictures which are sequentially displayed in the display section, a picture whose image quality is in accordance with the average.

The display device in accordance with the present invention is preferably arranged such that: the image quality specifying means specifies, as a setting value for specifying an image quality, a setting value of a picture which is selected by user operation from the pictures that are sequentially displayed and are at image qualities in accordance with the plurality of setting values; and the image quality adjustment instructing means instructs the image quality adjusting section to cause the display section to display the picture at the setting value for specifying an image quality.

The above arrangement enables a user to select, from pictures being displayed sequentially, a picture whose image quality meets a user's preference. This allows the display device to display a picture at an image quality selected by the user.

The display device in accordance with the present invention is preferably arranged such that: the image quality specifying means specifies, as a setting value for specifying an image quality, each of the plurality of setting values which correspond to the respective plurality of users; and the image quality adjustment instructing means instructs the image quality adjusting section to cause the display section to simultaneously display, in respective regions into which a displaying region of the display section has been divided, pictures having respective image qualities that are in accordance with the respective plurality of setting values which correspond to the respective plurality of users.

According to the above arrangement, it is possible for the display device to simultaneously display, in the respective regions into which the displaying region has been divided, pictures having respective image qualities that are in accordance with the respective plurality of setting values which have been set in advance by the respective plurality of users. This enables a plurality of users viewing the display device to view simultaneously a plurality of image qualities corresponding to the respective plurality of users.

The display device in accordance with the present invention is preferably arranged to further include: genre obtaining means for obtaining, from the pictures, genre information indicative of genres of the respective pictures, the recording section recording (i) data in which the plurality of setting values, the user information, and the genre information are associated with each other and (ii) data in which genre information of a picture having been viewed within a past given time period and user information that corresponds to a user having viewed the picture are associated with each other, the image quality specifying means specifying, as a setting value for specifying an image quality, a setting value which is associated with user information that is, of all user information recorded in the recording section, most associated with genre information corresponding to a picture which is being supplied to the display device, and the image quality adjustment instructing means instructing the image quality adjusting section to cause the display section to display, in a corresponding one of the regions, a picture having an image quality that corresponds to the setting value thus specified.

Note here that the data which is recorded in the recording section and in which genre information of a picture having been viewed within a past given time period and user information that corresponds to a user having viewed the picture are associated with each other shows how frequently a user corresponding to the user information views a specific genre. That is, the data shows that a user corresponding to user information which is most associated with genre information corresponding to a picture which is being supplied to the display device is a most frequent viewer of a picture of the specific genre.

In other words, the arrangement allows the display device to (i) display a picture at an image quality which is in accordance with a setting value of the most frequent viewer and (ii) display, in a corresponding one of the regions, a picture whose image quality is in accordance with a setting value of the most frequent viewer.

The display device in accordance with the present invention may be arranged such that: the image quality specifying means specifies, as a setting value for specifying an image quality, an average of the plurality of setting values thus obtained; and the image quality adjustment instructing means instructs the image quality adjusting section to cause the display section to display, in a corresponding one of the regions, a picture having an image quality that corresponds to the average thus specified.

The above arrangement allows the display device to display a picture at an image quality which is in accordance with an average of the plurality of setting values which have been set in advance by a respective plurality of users. Accordingly, the display device can display, in a corresponding one of the regions, a picture whose image quality is in accordance with the average.

The display device in accordance with the present invention is preferably arranged such that: the image quality specifying means specifies, as a setting value for specifying an image quality, a setting value of a picture which is selected by user operation from the pictures that have been displayed in the respective regions and are at image qualities in accordance with the plurality of setting values; and the image quality adjustment instructing means instructs the image quality adjusting section to cause the display section to display the picture at the setting value for specifying an image quality.

The above arrangement enables a user to select, from pictures being simultaneously displayed in the respective regions into which the display region has been divided, a picture whose image quality meets a user's preference. This allows the display device to display a picture at an image quality which has been selected by the user. According to this, for example, after simultaneously viewing a plurality of image qualities corresponding to a respective plurality of users and comparing the plurality of image qualities, a plurality of users viewing the display device can select a favorite image quality and view a picture at the favorite image quality.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is suitably used as a display device of a television receiver or the like.

Reference Signs List

10 Display device
20 Remote control light receiving section
21 Recording section
22 Image quality adjusting section
23 Display section
25 Camera (Photographing section)
30 Remote controller
100 Main control section
110 Instruction obtaining section
120 Image quality setting section
130 User specifying section (User specifying means)
140 Genre obtaining section (Genre obtaining means)
150 Image quality adjustment instructing section (Image quality adjustment instructing means)
160 Face extracting section (Face extracting means)
170 Image quality specifying section (Image quality specifying means)

The invention claimed is:

1. A display device comprising:
a display section which displays a picture;
an image quality adjusting section which adjusts an image quality of the picture in accordance with a setting value for specifying an image quality and causes the display section to display the picture whose image quality has been adjusted;
user specifying means for specifying a user viewing the display device;
image quality specifying means for, in a case where the user specifying means has specified a plurality of users,
(i) obtaining, from a recording section, a plurality of setting values that are associated with user information for discriminating the plurality of users and are used to specify an image quality, and (ii) specifying, in accordance with the plurality of setting values thus obtained, a plurality of image qualities of a respective plurality of pictures to be displayed in the display section;

image quality adjustment instructing means for instructing the image quality adjusting section to cause the display section to sequentially display the plurality of pictures at the respective plurality of image qualities specified by the image quality specifying means;

a photographing section which photographs .a vicinity of the display device and generates photographed image information;

face extracting means for obtaining the photographed image information from the photographing section, and obtaining, in accordance with the photographed image information, user facial information indicative of a characteristic of a face of a user and genre obtaining means for obtaining, from the pictures, genre information indicative of genres of the respective pictures, the user specifying means specifying the user by comparing (A) the user facial information obtained by the face extracting means and (B) user facial information which is recorded in the recording section and is associated with the user information, the recording section recording (I) data in which the plurality of setting values, the user information, and the genre information are associated with each other and (II) data in which genre information of a picture having been viewed within a past given time period and user information that corresponds to a user having viewed the picture are associated with each other, the image quality specifying means specifying, as a setting value for specifying an image quality, a setting value of a picture which is selected by user operation from the pictures that are sequentially displayed and are at image qualities in accordance with the plurality of setting value, the image quality specifying means specifying, as a setting value for specifying an image quality, a setting value which is associated with user information that is, of all user information recorded in the recording section, most associated with genre information corresponding to a picture which is being supplied to the display device, and the image quality adjustment instructing means instructing the image quality adjusting section to cause the display section to display, in addition to the pictures which are sequentially displayed in the display section, a picture having an image quality that corresponds to the section value thus specified.

2. The display device as set forth in claim 1, wherein:

the image quality specifying means specifies, as a setting value for specifying an image quality, an average of the plurality of setting values thus obtained; and the image quality adjustment instructing means instructs the image quality adjusting section to cause the display section to display, in addition to the pictures which are sequentially displayed in the display section, a picture having an image quality that corresponds to the average thus specified.

3. A display device comprising:

a display section which displays a picture;

an image quality adjusting section which adjusts an image quality of the picture in accordance with a setting value for specifying an image quality and causes the display section to display the picture whose image quality has been adjusted;

user specifying means for specifying a user viewing the display device;

image quality specifying means for, in a case where the user specifying means has specified a plurality of users, (i) obtaining, from a recording section, a plurality of setting values that are associated with user information for discriminating the plurality of users and are used to specify an image quality, and (ii) specifying, in accordance with the plurality of setting values thus obtained, a plurality of image qualities of a respective plurality of pictures to be displayed in the display section;

image quality adjustment instructing means for instructing the image quality adjusting section to cause the display section to simultaneously display, in respective regions into which a displaying region of the display section has been divided, the plurality of pictures at the respective plurality of image qualities specified by the image quality specifying means;

a photographing section which photographs a vicinity of the display device and generates photographed image information;

face extracting means for obtaining the photographed image information from the photographing section, and obtaining, in accordance with the photographed image information, user facial information indicative of a characteristic of a face of a user; and genre obtaining means for obtaining, from the pictures, genre information indicative of genres of the respective pictures;

the recording section recording (A) data in which the plurality of setting values, the user information, and the genre information are associated with each other and (B) data in which genre information of a picture having been viewed within a past given time period and user information that corresponds to a user having viewed the picture are associated with each other, the user specifying means specifying the user by comparing (I) the user facial information obtained by the face extracting means and (II) user facial information which is recorded in the recording section and is associated with the user information, the image quality specifying means specifying, as a setting value for specifying an image quality, a setting value of a picture which is selected by user operation from the pictures that have been displayed in the respective regions and are at image qualities in accordance with the plurality of setting values, the image quality specifying means specifying, as a setting value for specifying an image quality, a setting value which is associated with user information that is, of all user information recorded in the recording section, most associated with genre information corresponding to a picture which is being supplied to the display device, and the image quality adjustment instructing means instructing the image quality adjusting section to cause the display section to display, in a corresponding one of the regions, a picture having an image quality that corresponds to the setting value thus specified.

4. The display device as set forth in claim 3, wherein:

the image quality specifying means specifies, as a setting value for specifying an image quality, an average of the plurality of setting values thus obtained; and the image quality adjustment instructing means instructs the image quality adjusting section to cause the display section to display, in, a corresponding one of the regions, a picture having an image quality that corresponds to the average thus specified.

5. A television receiver comprising a display device recited in claim 1.

6. A method for controlling a display device which displays a picture,
said method comprising the steps of:
(a) specifying a user viewing the display device;
(b) in a case where a plurality of users have been specified in the step (a), (i) obtaining, from a recording section, a plurality of setting values that are associated with user information for discriminating the plurality of users and are used to specify an image quality, and (ii) specifying a plurality of image qualities in accordance with the plurality of setting values thus obtained;
(c) instructing the image quality adjusting section to sequentially display a plurality of pictures at the respective plurality of image qualities specified in the step (b);
(d) obtaining photographed image information from a photographing section which photographs a vicinity of the display device and generates the photographed image information, and obtaining, in accordance with the photographed image information, user facial information indicative of a characteristic of a face of a user; and
(e) obtaining, from the pictures, genre information indicative of genres of the respective pictures,
the recording section recording (A) data in which the plurality of setting values, the user information, and the genre information are associated with each other and (B) data in which genre information of a picture having been viewed within a past given time period and user information that corresponds to a user having viewed the picture are associated with each other,
in the step (a), the user being specified by comparing (I) the user facial information obtained in the step (d) and (II) user facial information which is recorded in the recording section and is associated with the user information, and
in the step (b), a setting value of a picture being specified as a setting value for specifying an image quality, the picture being selected by user operation from the pictures that are sequentially displayed and are at image qualities in accordance with the plurality of setting values,
the step (b) including specifying, as a setting value for specifying an image quality, a setting value which is associate with user information that is, of all user information recorded in the recording section, most associated with genre information corresponding to a picture which is being supplied to the display device, and
in the step (c), the image quality adjusting section being instructed to cause the display section to display, in addition to the pictures which are sequentially displayed in the display section, a picture having an image quality that corresponds to the setting value thus specified.

7. A method for controlling a display device which displays a picture,
said method comprising the steps of:
(a) specifying a user viewing the display device;
(b) in a case where a plurality of users, have been specified in the step (a), (i) obtaining, from a recording section, a plurality of setting values that are associated with user information for discriminating the plurality of users and are used to specify an image quality and (ii) specifying a plurality of image qualities in accordance with the plurality of setting values thus obtained;
(c) instructing an image quality adjusting section to simultaneously display, in respective regions into which a displaying region of a display section has been divided, a plurality of pictures at the respective plurality of image qualities specified in the step (b);
(d) obtaining photographed image information from a photographing section which photographs a vicinity of the display device and generates the photographed image information, and obtaining, in accordance with the photographed image information, user facial information indicative of a characteristic of a face of a user; and
(e) obtaining, rom the pictures, genre information indicative of genres of the respective pictures,
the recording section recording (A) data in which the plurality of setting values, the user information, and the genre information are associated with each other and (B) data in which genre information of a picture having been viewed within a past given time period and user information that corresponds to a user having viewed the picture are associated with each other,
in the step (a), the user being specified by comparing (i) the user facial information obtained in the step (d) and (ii) user facial information which is recorded in the recording section and is associated with the user information, and
in the step (b), a setting value of a picture being specified as a setting value for specifying an image quality, the picture being selected by user operation from the pictures that are displayed in the respective regions and are at image qualities in accordance with the plurality of setting values,
the step (b) including specifying, as a setting value for specifying an image quality, a setting value which is associated with user information that is, of all user information recorded in the recording section, most associated with genre information corresponding to a picture which is being supplied to the display device, and
in the step (c), the image quality adjusting section being instructed to cause the display section to display, in a corresponding one of the regions, a picture having an image quality that corresponds to the setting value thus specified.

8. A non-transitory computer-readable recording medium in which a program for causing a display device recited in claim 1 to operate is recorded.

* * * * *